United States Patent
Reymond (10) Patent No.: US 10,003,748 B2
(45) Date of Patent: Jun. 19, 2018

(54) METHOD AND DEVICE FOR PROCESSING HIGH-FREQUENCY MOVEMENTS IN AN OPTRONIC SYSTEM

(71) Applicant: SAFRAN ELECTRONICS & DEFENSE SAS, Boulogne Billancourt (FR)

(72) Inventor: Georges-Olivier Reymond, Boulogne Billancourt (FR)

(73) Assignee: SAFRAN ELECTRONICS & DEFENSE SAS, Boulogne Billancourt (FR)

( * ) Notice: Subject to any disclaimer, the term of this patent is extended or adjusted under 35 U.S.C. 154(b) by 0 days. days.

(21) Appl. No.: 15/324,923

(22) PCT Filed: Jul. 15, 2015

(86) PCT No.: PCT/EP2015/066135
§ 371 (c)(1),
(2) Date: Jan. 9, 2017

(87) PCT Pub. No.: WO2016/008911
PCT Pub. Date: Jan. 21, 2016

(65) Prior Publication Data
US 2017/0214854 A1  Jul. 27, 2017

(30) Foreign Application Priority Data
Jul. 18, 2014 (FR) ...................... 14 56947

(51) Int. Cl.
*H04N 5/232* (2006.01)
*B64D 47/08* (2006.01)

(52) U.S. Cl.
CPC ..... *H04N 5/23287* (2013.01); *H04N 5/23254* (2013.01); *H04N 5/23258* (2013.01); *B64D 47/08* (2013.01)

(58) Field of Classification Search
CPC ........... H04N 5/23287; H04N 5/23254; H04N 5/23258; B64D 47/08
See application file for complete search history.

(56) References Cited

U.S. PATENT DOCUMENTS

| 5,218,442 A | 6/1993 | Hamada et al. |
| 2003/0197787 A1 | 10/2003 | Satoh et al. |

(Continued)

FOREIGN PATENT DOCUMENTS

| EP | 2 420 970 A1 | 2/2012 |
| GB | 2 447 264 A | 9/2008 |

OTHER PUBLICATIONS

Oct. 19, 2015 Search Report issued in International Patent Application No. PCT/EP2015/066135.

*Primary Examiner* — Timothy J Henn
(74) *Attorney, Agent, or Firm* — Oliff PLC; R. Brian Drozd (57) ABSTRACT

A method for processing high-frequency movements in an optronic system including an image sensor functioning with a first acquisition frequency, each image obtained by the image sensor representing a scene, the method includes a step of obtaining signal values representing a movement of the scene from a high-frequency movement sensor functioning with a second acquisition frequency higher than the first acquisition frequency, a step of determining values representing a movement of an image in the course of acquisition by the image sensor from values of the signals representing the movement of the scene, and a step of transmitting the values representing the movement of the image in the course of acquisition by the image sensor to a movement compensation device so that the movement compensation device can compensate for the movement of the image in the course of acquisition by the image sensor.

11 Claims, 3 Drawing Sheets

(56) References Cited

U.S. PATENT DOCUMENTS

| | | | | |
|---|---|---|---|---|
| 2011/0298937 A1* | 12/2011 | Ogawa | ............... | H04N 5/23258 348/208.4 |
| 2013/0044230 A1* | 2/2013 | Zhou | .................. | H04N 5/23267 348/208.6 |
| 2013/0083171 A1* | 4/2013 | Habuka | ................... | G06T 5/003 348/47 |
| 2014/0232886 A1* | 8/2014 | Takayama | .......... | H04N 5/23254 348/208.6 |
| 2015/0123990 A1* | 5/2015 | Satoh | ................ | H04N 5/23248 345/625 |

* cited by examiner

METHOD AND DEVICE FOR PROCESSING HIGH-FREQUENCY MOVEMENTS IN AN OPTRONIC SYSTEM

The present invention relates to a method and device for processing high-frequency movements in an optronic system and an optronic system using said device and said method.

An optronic system, such as a photographic apparatus, binoculars, telescope, a telescopic sight or a gyrostabilised bowl (GSB) equipping an airborne observation system, generally uses image-stabilisation techniques. These image-stabilisation techniques make it possible to reduce blurring by motion in the images caused by more or less intentional movements of the optronic system. Image-stabilisation techniques therefore make it possible to obtain an improvement to the images in terms of quality and precision.

Image-stabilisation techniques can use optical-stabilisation methods. Optical-stabilisation methods consist of stabilising an image acquisition by varying an optical path followed by a light beam representing a scene towards a sensitive surface such as a film or sensor. Optical-stabilisation methods comprise for example lens-stabilisation methods and sensor-stabilisation methods. Known lens-stabilisation methods use floating lenses moving orthogonally with respect to an optical axis of the lens by means of solenoids. Movements are detected by gyrometers detecting horizontal and vertical movements and can thus be compensated for by controlling the position of the floating lenses by means of electromagnets. Sensor-stabilisation methods for their part are dedicated to digital apparatus. Each image requiring a greater or lesser acquisition time according to the brightness conditions, these methods consist of moving an image sensor during the time taken for acquisition of an image so as to compensate for the movements of a digital apparatus.

GSBs in general use optical-stabilisation techniques of the lens-stabilisation type where it is the lens and sensor overall that are moved.

Figure 1A:
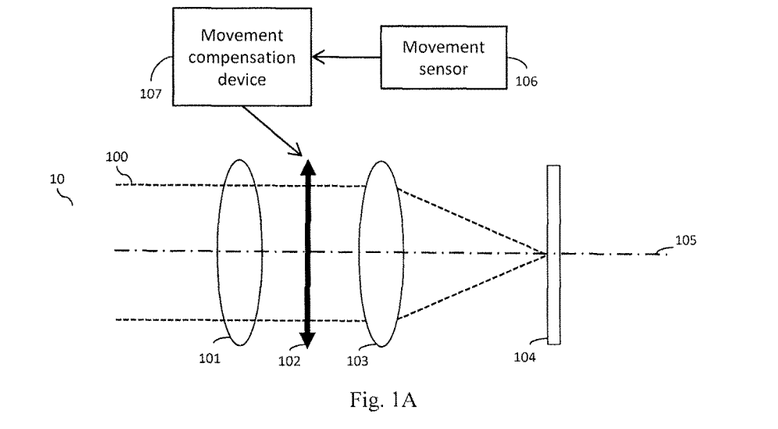
FIG. 1A depicts schematically an example of a conventional optronic system.

FIG. 1A depicts schematically an optronic system 10, such as for example a photographic apparatus, consisting of an optical element comprising for example two groups of lenses, such as the groups of lenses 101 and 103, a movable element 102 generally implemented by a floating lens, an image sensor 104 such as a CCD (charge-coupled device) sensor or CMOS (complementary metal-oxide semiconductor) sensor. The groups of lenses 101 and 103, the movable element 102 and the image sensor 104 are perpendicular to an optical axis 105. The groups of lenses 101 and 103 and movable element 102 make a light beam 100 converge towards the image sensor 104. A movement sensor 106, implemented for example by a gyrometer, determines movements of the optronic system and transmits this information to a movement-compensation device 107 modifying the position of the movable element 102 so as to compensate for the movements of the optronic system 10. The movement-compensation device 107 is implemented for example by motors or electromagnets. The image sensor 104 produces images from the light beam 100 received. The images are produced at a signal-acquisition frequency (or image-acquisition frequency) of around a few tens of hertz and are transmitted in the direction of a display or memory.

Image-stabilisation techniques, such as those used in photographic apparatus or GSBs, make it possible to compensate for low-frequency movements and medium-frequency movements. On the other hand, these image-stabilisation techniques are in general not very effective for compensating for high-frequency movements. This is because high-frequency movements are very rapid movements that only high-precision movement sensors are able to capture. Moreover, it is considered that an optronic system is a rigid structure undergoing a global movement when low- and medium-frequency movements are applied to this system. On the other hand, when a high-frequency movement is applied to an optronic system, this system is considered to be a deformable structure, to which local micromovements are applied. An application of conventional image-stabilisation techniques to the processing of high-frequency movements could consist of introducing a plurality of high-precision sensors into optronic-system structures. This solution does however give rise to an increase in complexity and manufacturing cost of the optronic systems.

Some optronic systems that are not aimed at delivering high-frequency images can be allowed not to process high-frequency movements. For these systems, it is considered that it is acceptable that, after compensation of the low- and medium-frequency movements by conventional image-stabilisation techniques, non-compensated residual high-frequency movements may remain and cause problems of sharpness in the images. The situation is very different for optronic systems requiring high precision such as a GSB or a photographic apparatus equipped with a telephoto lens. This is because, in this case, an image of mediocre quality could cause faulty interpretation of the content of the image.

The aim of the invention is to solve the problems mentioned above. The invention aims in particular to propose a simple and effective method and device for processing high-frequency movements suffered by an optronic system and an optronic system using this method and this device for processing high-frequency movements.

To this end, according to a first aspect of the present invention, the present invention relates to a method for processing high-frequency movements in an optronic system comprising an image sensor functioning with a first signal-acquisition frequency, referred to as the image frequency, each image obtained by the image sensor representing a scene, the method comprising:
  a step of obtaining signal values representing a movement of said scene on the part of a high-frequency movement sensor generating signal values representing movements that may affect the acquisition of images by the image sensor with a second signal-acquisition frequency, referred to as the movement frequency, higher than the image frequency,
  a step of determining values representing a movement of an image in the course of acquisition by the image sensor from values of the signals representing the movement of said scene,
  a step of transmitting the thus determined values representing the movement of the image in the course of acquisition by the image sensor to a movement-compensation device so that said movement-compensation device can implement a feedback in the optronic system in order to compensate for the movement of the image being acquired by the image sensor.

The method therefore makes it possible to attenuate high-frequency movements that might affect acquisitions of images by the image sensor.

According to one embodiment, the determination of the values representing the movement of the image in the course of acquisition by the image sensor comprises a matrix operation between the values of the signals representing the movement of said scene and a conversion matrix.

The operation for determining the values representing the movement of the image in the course of acquisition by the image sensor is therefore simple to perform.

According to one embodiment, an inverse matrix of the conversion matrix is determined by a determination method comprising a step of obtaining a reference image from an original image acquired by the image sensor, a step of simulating first values of the signals representing a movement obtained by the high-frequency movement sensor when the high-frequency movement sensor is subjected to a light beam corresponding to the reference image, a step of applying movements of predetermined movement values to the reference image in order to obtain a set of moved images, for each moved image in the set of moved images, a step of simulating second values of the signals representing a movement obtained by the high-frequency movement sensor when the high-frequency movement sensor is subjected to a light beam corresponding to the moved image and a step of determining the inverse matrix of the conversion matrix from first and second values of the signals representing a movement obtained by the high-frequency movement sensor and predetermined movement values.

The conversion matrix is therefore obtained by simulation and requires no physical movement in the optronic system.

According to one embodiment, for each moved reference image, the predetermined movement values comprise a horizontal movement value and a vertical movement value.

According to one embodiment, for each moved reference image, the predetermined movement values comprise a movement direction value and a movement amplitude value.

According to one embodiment, the high-frequency movement sensor is a multi-element photodiode.

According to one embodiment, the set of moved reference images comprises at least two images.

According to one embodiment, the conversion matrix is updated periodically at a frequency lower than or equal to the image frequency.

The updating of the conversion matrix makes it possible to take into account variations in the scene observed by the optronic system.

According to one embodiment, the feedback is implemented in the optronic system with a frequency less than or equal to the movement frequency.

The frequency of the feedback can thus be adapted to the frequency of variation of the movements undergone by the optronic system.

According to one embodiment, the reference image results from an application of a subpixel interpolation to the original image obtained by the image sensor.

In this way, very small movements can be captured and compensated for.

According to a second aspect of the invention, the invention relates to a device for processing high-frequency movements in an optronic system comprising an image sensor function with a first signal-acquisition frequency, referred to as the image frequency, each image obtained by the image sensor representing a scene, the device comprising means for obtaining signal values representing a movement of said scene on the part of a high-frequency movement sensor, the high-frequency movement sensor generating signal values representing movements of said scene with a second signal-acquisition frequency, referred to as the movement frequency, higher than the image frequency, means for determining values representing a movement of an image being acquired by the image sensor from values of the signals representing the movement of said scene, means for transmitting the determined values representing the movement of image acquired by the image sensor to a movement-compensation device so that said movement-compensation device can implement a feedback in the optronic system in order to compensate for the movement of the image in the course of acquisition by the image sensor.

According to one embodiment, a correction filter is inserted in front of the image sensor and/or in front of the high-frequency sensor so as to compensate for any difference between a spectral response of the image sensor and a spectral response of the high-frequency movement sensor.

According to a third aspect of the invention, the invention relates to an optronic system comprising an image sensor functioning with a first signal-acquisition frequency, each image obtained by the image sensor representing a scene, and a movement-compensation device, the system comprising means for implementing the method for processing high-frequency movements according to the first aspect.

According to a fourth aspect of the invention, the invention relates to an optronic system comprising an image sensor functioning with a first signal-acquisition frequency, each image obtained by the image sensor representing a scene, and a movement-compensation device, the system comprising a high-frequency movement sensor generating signal values representing movements of said scene with a second signal-acquisition frequency higher than the first signal-acquisition frequency, and a device for processing high-frequency movements according to the second aspect.

According to a fifth aspect of the invention, the invention relates to a computer program product characterised in that it comprises instructions for the implementation, by a device, of the method according to the first aspect, when said program is executed by a processor of said device.

According to a sixth aspect of the invention, the invention relates to storage means, characterised in that they store a computer program containing instructions for the implementation, by a device, of the method according to the first aspect when said program is executed by a processor of said device.

The features of the invention mentioned above, as well as others, will emerge more clearly from a reading of the description of an example embodiment, said description being given in relation to the accompanying drawings, among which.

Figure 1B:
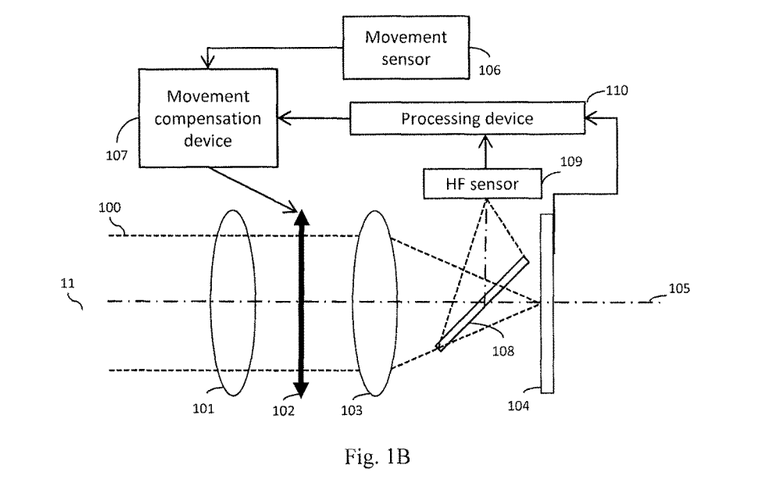
FIG. 1B depicts schematically an example of an optronic system using a processing device and method able to process high-frequency movements of the optronic system.

FIG. 1B depicts schematically an example of an optronic system 11 using a device and a processing method able to process the high-frequency movements of the optronic system 11. The optronic system 11 comprises elements identical to the optronic system 10 in FIG. 1A, each identical element being represented by the same reference. The optronic system 11 nevertheless comprises supplementary elements for processing high-frequency movements. The optronic system 11 comprises a device 108 for redirecting part of the light beam 100 to a high-frequency optical movement sensor 109. The device 108 may for example be a semi-reflective device. The high-frequency movement sensor 109 may for example be a multi-element photodiode (which will be referred to hereinafter as "ME photodiode"), such as a two-, four- or eight-quadrant photodiode, a position-sensing photodiode or a matrix sensor comprising very few pixels but functioning at high frequency. The high-frequency movement sensor 109 is able to supply values representing a movement with a signal-acquisition frequency of around a few kHz. It is assumed here that the image sensor and the high-frequency movement sensor function in similar and preferably identical light wavelength ranges, just as these two sensors have similar and preferably identical spectral responses in these wavelength ranges.

Figure 3:
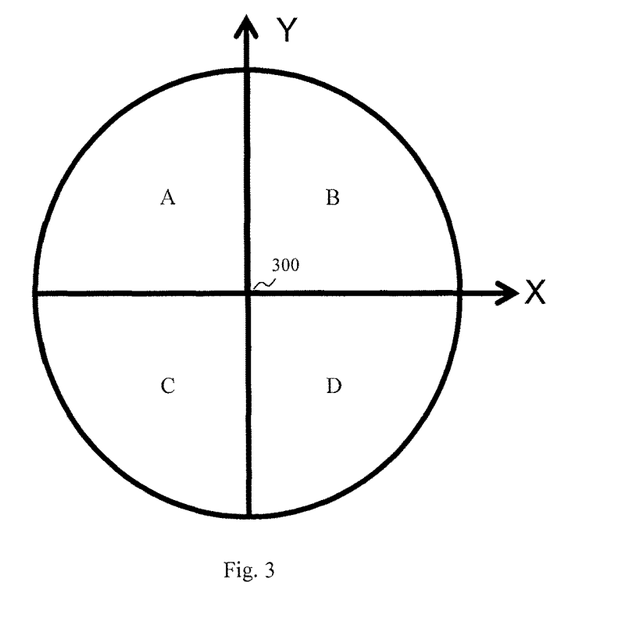
FIG. 3 depicts schematically a multi-element photodiode.

FIG. 3 depicts schematically an ME photodiode. ME photodiodes are devices normally used for making adjustments in laser readers such as CD or DVD readers or in satellites for controlling laser lines of sight. An ME photodiode functions in the majority of cases with a signal-acquisition frequency of a few kHz. An ME photodiode is generally circular in shape, as depicted in FIG. 3, or square. An ME photodiode is composed of a plurality of quadrants. FIG. 3 depicts an ME photodiode comprising four quadrants denoted $S_A$, $S_B$, $S_C$ and $S_D$. Each quadrant comprises a sensor that will be referred to hereinafter as megapixels. Each megapixel produces a signal when it is touched by a light beam. The signals produced respectively by megapixels of the quadrants A, B, C and D are denoted $S_A$, $S_B$, $S_C$ and $S_D$. In addition, an ME photodiode produces two signals ΔX and ΔY. The signals ΔX and ΔY represent a movement in a scene corresponding to the light beam received by the ME photodiode.

The values of the signals ΔX and ΔY are related to the values of the signals $S_A$, $S_B$, $S_C$ and $S_D$ by the following equations:

$$\Delta X = \frac{-S_A + S_B - S_C + S_D}{S_A + S_B + S_C + S_D};$$

$$\Delta Y = \frac{S_A + S_B - S_C - S_D}{S_A + S_B + S_C + S_D};$$

ME photodiodes are normally used in optronic systems for following an object in a scene. The objects followed are in general objects with known shapes, such as for example laser pointers generated by laser designators. ME photodiodes have a barycentre corresponding to a reference position of an object being followed. In the ME photodiode shown schematically in FIG. 3, the barycentre of the ME photodiode corresponds to the reference 300. As long as an object being followed is positioned on the barycentre of the ME photodiode, the ME photodiode produces null signals ΔX and ΔY. As soon as the object being followed moves away from the barycentre of the ME photodiode, at least one of the signals ΔX and ΔY becomes non-null, which subsequently makes it possible to adjust the optronic system onto the object being followed.

In the optronic system 11, the light beam 100 is transmitted simultaneously in the direction of the image sensor 104 and the high-frequency movement sensor 109, each sensor receiving part of the light beam 100. In this way, high-frequency movements that may affect the acquisition of images by the image sensor 104 are detected and values representing these movements can be measured by the high-frequency movement sensor 109 with a signal-acquisition frequency of around a few kHz.

The values representing the movement that are measured by the high-frequency movement sensors can in general not be used directly by movement compensation devices since they are dependent on the content of the scene. In the case of the optronic system 11, the values representing the movement are transmitted to a processing device 110 determining movement values that can be used by the movement-compensation device 107. These movement values that can be used by the movement-compensation device 107 represent movements in the images acquired by the image sensor 104 and are measured in numbers of pixels. These movements are referred to hereinafter as "pixel level movements". There exists a direct relationship between the pixel level movements and the movements of the optronic system. The movements of an optronic system that concern us here are angular movements. An optical system has a focal distance f known by design. The focal distance f is a parameter making it possible to make the link between a pixel level movement and the angular movement.

The values representing the pixel movements can therefore be used directly by the movement-compensation device 107 to compensate for the movements of the optronic system. In this way, the processing device 110 controls the movement-compensation device 107 on the basis of the values of the movement-representing signals ΔX and ΔY produced by the ME photodiode 109. When the high-frequency movement sensor 109 is an ME photodiode, there exists a relationship between the values of the signals ΔX and ΔY and the values representing the pixel level movements.

When the values representing the pixel level movements are expressed in the form of a horizontal-movement value Δx and a vertical-movement value Δy, the relationship between the signals ΔX and ΔY and the values representing the pixel level movements is as follows:

$$\begin{pmatrix} \Delta X \\ \Delta Y \end{pmatrix} = M \cdot \begin{pmatrix} \Delta x \\ \Delta y \end{pmatrix}$$

where M is a 2×2 square conversion matrix dependent on a content of the scene aimed at.

However, the values of the pixel level movements could just as well be expressed in the form of polar coordinates comprising a movement direction θ and a movement amplitude ρ. In this cage the relationship would be as follows:

$$\begin{pmatrix} \Delta X \\ \Delta Y \end{pmatrix} = M' \cdot \begin{pmatrix} \rho \\ \theta \end{pmatrix}$$

where M' is a 2×2 square conversion matrix that is dependent on a content of the scene aimed at.

When the values representing pixel level movements are determined by the processing device 110, they are transmitted to the movement compensation device 107 so that they can compensate these pixel level movements. In one embodiment, the frequency of transmission of the values representing the pixel level movements to the movement-compensation device 107 is equal to the signal-acquisition frequency of the high-frequency movement sensor 109 (i.e.

the signal-acquisition frequency of the ME photodiode). In this way, the movement-compensation device 107 can compensate for high-frequency movements. It will be noted that the movement-compensation device 107 always receives information representing low- and medium-frequency movements on the part of the movement sensor 106. Thus the movement-compensation device 107 can compensate for low-, medium- and high-frequency movements.

Figure 4:
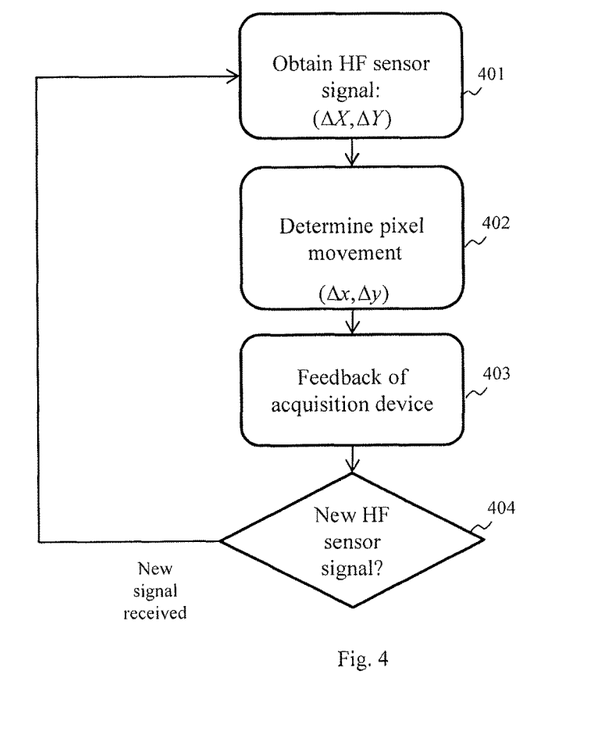
FIG. 4 depicts schematically an example of a method for processing high-frequency movements of an optronic system implemented by the processing device.

FIG. 4 shows schematically an example of a method for processing high-frequency movements of the optronic system 11 implemented by the processing device 110. This method comprises the obtaining by the processing device 110 of at least one value of a signal representing movements of the optronic system 11. When the high-frequency movement sensor 109 is an ME photodiode, the processing device 110 obtains two values of a signal representing pixel level movements. As seen above, a pixel level movement represents a movement of the optronic system. In a step 401, the processing device 110 obtains values of the signals ΔX and ΔY of the high-frequency movement sensor 109.

During a step 402, the processing device 110 determines the values representing pixel level movements as follows:

$$\begin{pmatrix} \Delta x \\ \Delta y \end{pmatrix} = M^{-1} \cdot \begin{pmatrix} \Delta X \\ \Delta Y \end{pmatrix}$$

where $M^{-1}$ is the inverse of the conversion matrix M.

When the values representing the pixel level movements are expressed in polar coordinates, the following equation applies:

$$\begin{pmatrix} \rho \\ \theta \end{pmatrix} = (M')^{-1} \cdot \begin{pmatrix} \Delta X \\ \Delta Y \end{pmatrix}$$

where $M'^{-1}$ is the inverse of the conversion matrix M'.

The conversion matrix M (or respectively M') is assumed to be known by the processing device 110 during step 402. A method for determining the conversion matrix M (or respectively M') implemented periodically by the processing device 110 is described hereinafter in relation to FIG. 5.

In a step 403, the processing device 110 transmits the values representing the pixel level movements thus calculated to the movement-compensation device 107 so that it can implement a feedback in the optronic system in order to compensate for the pixel level movement calculated. In this embodiment, the transmission of the values representing pixel level movements follows the signal-acquisition frequency of the ME photodiode. The feedback can therefore be implemented at the signal-acquisition frequency of the photodiode. A high-frequency feedback is therefore obtained.

The processing device 110 next awaits reception of new signal values ΔX and ΔY from the high-frequency movement sensor 109. When new signal values ΔX and ΔY are received, the processing device once again implements step 401.

The method for determining the values representing pixel level movements described in relation to FIG. 4 requires knowledge of the conversion matrix M (or respectively M'). In the object-following or adjusting optronic devices, the conversion matrix M (or respectively M') is in general a known constant matrix. The invention addresses the case of non-calibrated optronic devices such as photographic apparatus or GSBs. In this case, the conversion matrix M (or respectively M') changes over time and depends on the scene on which the ME photodiode is focused. It is then necessary to determine the conversion matrix M (or respectively M') and to re-update this matrix in order to take into account the changes in the scene on which the ME photodiode is focused.

Figure 5:
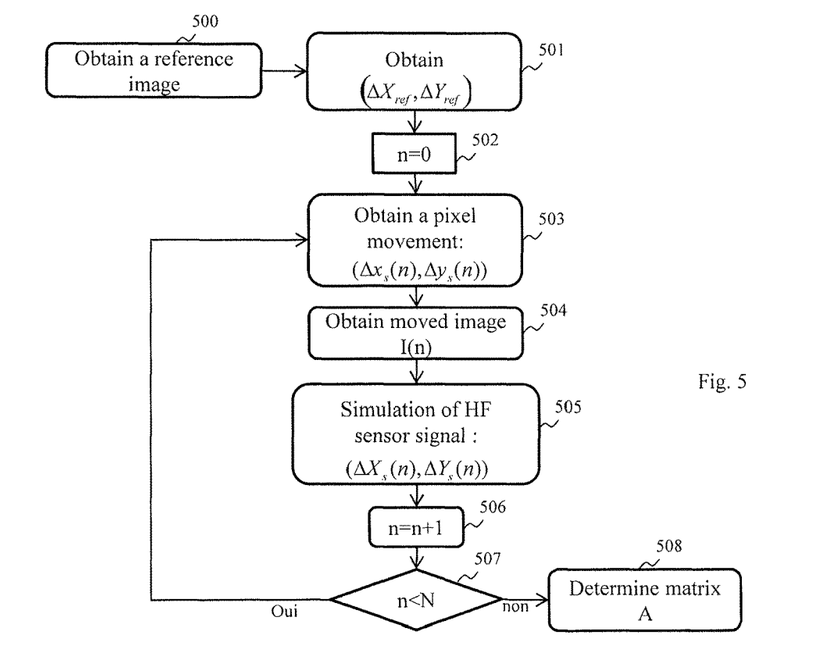
FIG. 5 depicts schematically an example of a method for determining a conversion matrix used in the method for the processing of high-frequency movements.

FIG. 5 illustrates an example of a method for determining the conversion matrix M (or respectively M') used periodically by the processing device 110. In one embodiment, the method for determining the conversion matrix M (or respectively M') is used by the processing device 110 each time an image is acquired by the image sensor 104. An image acquired by the image sensor 104 is hereinafter referred to as the "original image".

In a step 500, an original image acquired by the image sensor 104 is obtained by the processing device 110. In one embodiment, the processing device 110 uses this original image as the reference image when the conversion matrix M (or respectively M') is determined.

In a step 501, the processing device 110 simulates the signals $\Delta X_{ref}$ and $\Delta Y_{ref}$ that the ME photodiode would supply if it were subjected to a light beam corresponding to the reference image according to a simulation method that will be explained below.

In a step 502, a variable n is initialised to zero.

During steps 503 to 507, the processing device 110 applies movements of predetermined values to the reference image in order to obtain a set of moved images and, for each moved image, simulates the signals ΔX and ΔY that the photodiode ME would supply if it were subjected to a light beam corresponding to the moved image. These steps are detailed hereinafter.

During step 503 a pixel level movement of a predetermined value comprising a horizontal movement value $\Delta x_s(n)$ and a vertical movement value $\Delta y_s(n)$ (or respectively a movement direction value $\theta_s(n)$ and a movement amplitude $\rho_s(n)$ in the case of a movement expressed in polar coordinates) is obtained by the processing device 110. This predetermined movement value is obtained for example from a list of predetermined movement values stored in a memory of the processing device 110.

In a step 504, a moved image I(n) is created by moving the pixels of the reference image by the value of the pixel level movement $(\Delta x_s(n), \Delta y_s(n))$ (or respectively $(\theta_s(n), \rho_s(n))$).

In a step 505, the processing device implements a method of simulating the values of the signals $\Delta X_s(n)$ and $\Delta Y_s(n)$ that the ME photodiode would supply if it were subjected to a light beam corresponding to the moved image I(n). This simulation method is explained hereinafter. In this step, the processing device 110 determines the value of the signals $S_A$, $S_B$, $S_C$ and $S_D$.

The values of the signals $\Delta X_s(n)$ and $\Delta Y_s(n)$ are next calculated as follows:

$$\Delta X_s(n) = \frac{-S_A + S_B - S_C + S_D}{S_A + S_B + S_C + S_D} - \Delta X_{ref};$$

$$\Delta Y_s(n) = \frac{S_A + S_B - S_C - S_D}{S_A + S_B + S_C + S_D} - \Delta Y_{ref};$$

During a step 506, the variable n is incremented by one unit. During a step 507, the variable n is compared with a constant N that is explained below. When the variable n is less than N, the processing device 110 creates a new moved image I(n) by returning to step 503. A predetermined pixel level movement different from any other predetermined pixel level movement already used for moved images I(n) created previously is then obtained by the processing device 110.

If the variable n is equal to the constant N, step 507 is followed by a step 508 during which the conversion matrix M is determined.

The constant N fixes a number of images I(n) necessary for calculating the conversion matrix M (or respectively M'). The conversion matrix M (or respectively M') being a 2×2 matrix, it comprises four coefficients. The coefficients of the conversion matrix M (or respectively M') form a set of four unknowns to be determined. For each moved image I(n), the following equation applies:

$$\begin{pmatrix} \Delta X_s(n) \\ \Delta Y_s(n) \end{pmatrix} = M \cdot \begin{pmatrix} \Delta x_s(n) \\ \Delta y_s(n) \end{pmatrix} = \begin{pmatrix} a_{11} & a_{21} \\ a_{12} & a_{22} \end{pmatrix} \cdot \begin{pmatrix} \Delta x_s(n) \\ \Delta y_s(n) \end{pmatrix}$$

$$\begin{pmatrix} \Delta X_s(n) \\ \Delta Y_s(n) \end{pmatrix} = M' \cdot \begin{pmatrix} \rho_s(n) \\ \theta_s(n) \end{pmatrix} = \begin{pmatrix} a'_{11} & a'_{21} \\ a'_{12} & a'_{22} \end{pmatrix} \cdot \begin{pmatrix} \rho_s(n) \\ \theta_s(n) \end{pmatrix}$$

or in polar coordinates.

This equation therefore supplies two equations for each image I(n). Knowing for each image I(n) the values of the signals $\Delta X_s(n)$ and $\Delta Y_s(n)$ and the values of the corresponding pixel movement $(\Delta x_s(n), \Delta y_s(n))$ (or respectively $(\theta_s(n), \rho_s(n))$), it is necessary and sufficient to have two images I(n) to be able to calculate the four coefficients of the conversion matrix M (or respectively M'). In theory, it therefore suffices to fix the constant N at the value two in order to determine the conversion matrix M (or respectively M'). However, in order to avoid obtaining noisy coefficient values of the conversion matrix M (or respectively M'), it is preferable to fix the constant N at a value greater than two.

Then a system of 2N (N>2) equations with four unknowns is obtained, able to be solved conventionally by a linear regression during step 508.

As soon as it is determined, the conversion matrix M (or respectively M') is used by the processing device 110 during the pixel movement determination step 402.

Figure 6:
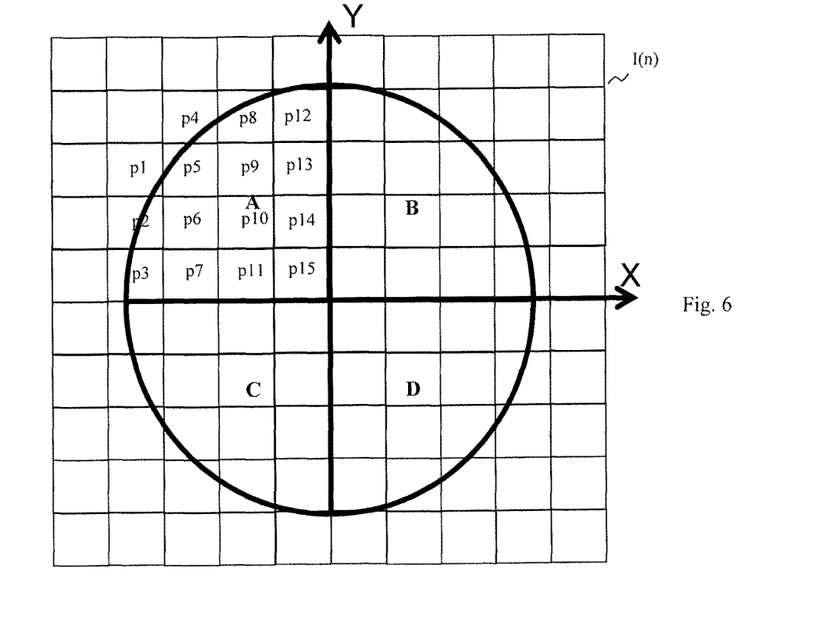
FIG. 6 illustrates a matching of pixels of an image with quadrants of a multi-element photodiode used in the method for the processing of high-frequency movements.

As seen above, the method for determining the matrix M (or respectively M') comprises, during steps 501 and 505, a method of simulating signal values $\Delta X_{ref}$ and $\Delta Y_{ref}$ and signals $\Delta X_s(n)$ and $\Delta Y_s(n)$ that would be supplied by the ME photodiode if it were subjected to a light beam corresponding respectively to the reference image or the moved image I(n). Let there be an image Î that can be a reference image or a moved image I(n). During the implementation of the simulation method, the processing device 110 matches each quadrant of the ME photodiode with a set of pixels of the image Î. For each quadrant, a sum of the values of the pixels of the image Î corresponding to the frame is calculated. The value of a signal $S_i (i \in \{A,B,C,D\})$ is then equal to the sum of the values of the pixels of the image Î calculated on the corresponding quadrant. FIG. 6 shows an example of matching of pixels of an image Î comprising 100 pixels with a four-quadrant photodiode. In this example, the value of the signal $S_A$ is calculated as a sum of the values of the pixels p1 to p15 corresponding to the quadrant A.

In the embodiment of the optronic system 11 described in relation to FIG. 1B, a single movement compensation device is used for processing the low- and medium-frequency movements perceived by the movement sensor 106 and the high-frequency movements perceived by the high-frequency movement sensor 109. In another embodiment, at least two movement compensation devices are used. A first device processes the low- and medium-frequency movements perceived by the movement sensor 106 and a second device processes the high-frequency movements perceived by the high-frequency movement sensor 109.

In one embodiment, the conversion matrix M (or respectively M') is updated periodically by the method for determining said matrix with a lower frequency than the image-acquisition frequency of the image sensor 104. The frequency of implementation of the method for determining the conversion matrix M (or respectively M') may also be adaptive, according for example to statistics on the changes in the values of the signals $\Delta X$ and $\Delta Y$. The frequency may for example be increased when the statistics show that the optronic system is in a period of large movements and decreases when the statistics show that the optronic system is in a period of small movements.

In one embodiment, when the moved images are created, a reference image is used resulting from a sub-pixel interpolation of the original image obtained by the image sensor 104 rather than directly the original image. The sub-pixel interpolation used may be an interpolation to a half, a quarter or an eighth of a pixel. In this way, high-frequency movements of low amplitude can also be processed by the movement compensation device 107. The sub-pixel interpolation may be adaptive according for example to statistics on the change of the signal values $\Delta X$ and $\Delta Y$. The interpolation may be omitted when the statistics show that the optronic system is in a period of large movements. An interpolation to a half or quarter of a pixel may be used when the statistics show that the optronic system is in a period of medium movements. An interpolation to an eighth of a pixel may be used when the statistics show that the optronic system is in a period of small movements.

In one embodiment, the frequency of transmission of the values representing pixel movements to the movement compensation device 107 is less than the signal acquisition frequency of the high-frequency movement sensor 109 (i.e. the signal acquisition frequency of ME photodiode) while remaining higher than the signal acquisition frequency of the image sensor 104. The frequency of transmission of the values representing the pixel movement to the movement compensation device 107 can be fixed adaptively according to statistics on the signals $\Delta X$ and $\Delta Y$. For example, when the statistics show that the signals $\Delta X$ and $\Delta Y$ vary little over time, the frequency of transmission of the values representing the pixel movements to the movement compensation device 107 can be reduced. On the other hand, when the statistics show that the signals $\Delta X$ and $\Delta Y$ vary rapidly over time, the frequency of transmission of the values representing the pixel movements to the movement compensation device 107 can be increased.

Up until then, we assumed that the images generated by the image sensor had only one component. These images may for example be grey-level images.

In one embodiment, the images generated by the image sensor 104 are multicomponent images such as RGB images. In this case, each pixel of an image generated by the image sensor comprises three components.

During steps 501 and 505, the processing device 110 simulates the signal that the ME photodiode 109 would generate if it were subjected to a light signal corresponding to a given image. During this calculation the sum of the values of the pixels included in each quadrant of the photodiode is calculated. In the case of pixels comprising a plurality of components, the value of a pixel is given by a linear combination of the components. For example, for a pixel comprising a red component (R), a green component (G) and a blue component (B), the value ρ of the pixel used in the simulation is:

$$p=a.R+b.G+c.B$$

The coefficients a, b and c are dependent on spectral response characteristics both of the image sensor 104 and of the ME photodiode 109. The coefficients a, b and c are assumed to be known by design.

In one embodiment, the high-frequency sensor 109 and the image sensor 104 have different spectral responses. It is important for the spectral responses of the two sensors to be as close as possible and ideally for these spectral responses to be identical. If, for example, there is a red zone in a scene and the image sensor 104 is not sensitive to this colour, it is difficult to correctly simulate the signals produced by the ME photodiode 109 since the image obtained by the image sensor 104 does not contain this information.

In order to correct the situation, a correction filter is inserted in front of the image sensor 104. The function of the correction filter is to correct the differences in the spectral responses of the two sensors. The spectral response of one sensor is represented by a quantal efficacy curve. The correction filter is adjusted so that the quantal efficacy curve of the image sensor 104 after filtering of the light beam 100 by the correction filter is as close as possible to the quantal efficacy curve of the high-frequency sensor 109. The correction filter can be implemented by a coloured filter used for obtaining a rough adjustment to which a stack of thin layers is added in order to obtain a fine adjustment of the filter.

In one embodiment, the correction filter is placed in front of the ME photodiode 109.

In one embodiment, a correction filter is place in front of the ME photodiode 109 and in front of the image sensor 104.

In one embodiment, the ME photodiode is replaced by a position-detecting photodiode. A position-detecting photodiode supplies the position of a barycentre of an image referred to as the "photometric barycentre". A movement of the image causes a movement of its barycentre, which causes variations in a signal produced by the position-detecting photodiode.

The method for processing high-frequency movements described in relation to FIG. 4 and the method for determining the conversion matrix M remain identical. However, the values of the signals ΔX and ΔY calculated in simulation during steps 501 and 505 are coordinates of the barycentre of the image. If an image contains $N_p$ pixels, each pixel having a value pi and coordinates $(x_i, y_i)$, then the coordinates of the barycentre are:

$$\Delta X=\Sigma(p_i {}^*x_i)/\Sigma p_i$$

$$\Delta Y=\Sigma(p_i {}^*y_i)/\Sigma p_i$$

where i is a variable varying from "1" to $N_p$

Figure 2:
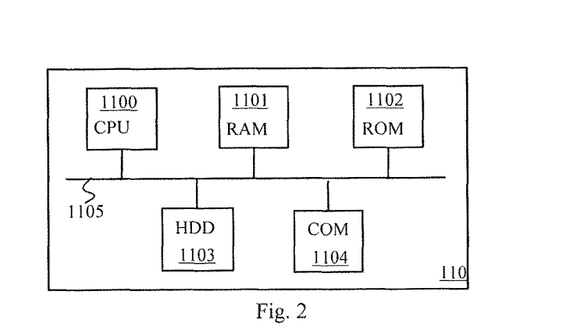
FIG. 2 illustrates schematically an example of hardware architecture of a processing device able to process the high-frequency movements of the optronic system.

FIG. 2 illustrates schematically an example of hardware architecture of the processing device 110. The processing device 110 comprises, connected by a communication bus 1105: a processor or CPU (central processing unit) 1100; a random access memory (RAM) 1101; a read only memory (ROM) 1102, a storage unit reader 1103 or a storage medium reader, such as an SD (secure digital) card reader or USB (universal serial bus) keys or a hard disc drive (HDD); at least one interface 1104 for exchanging data with other devices. The interface 110 enables for example the processing device 110 to receive signal values ΔX and ΔY from the high-frequency sensor 109 and original images from the image sensor 104.

The processor 1100 is capable of executing instructions loaded into the RAM 1101 from the ROM 1102, from an external memory (not shown), from a storage medium or from a communication network. When the processing device 110 is powered up, the processor 1100 is capable of reading instructions from the RAM 1101 and executing them. These instructions form a computer program causing the implementation, by the processor 1100, of all or some of the algorithms and steps described in relation to the processing device 110 and FIGS. 4 and 5.

All or some of the algorithms and steps described previously can thus be implemented in software form by the execution of a set of instructions by a programmable machine, such as a DSP (digital signal processor) or a microcontroller, or be implemented in hardware form by a machine or a dedicated component, such as an FPGA (field-programmable gate array) or an ASIC (application-specific integrated circuit).

The invention claimed is:

1. A method for processing high-frequency movements in an optronic system comprising an image sensor functioning with a first signal-acquisition frequency, referred to as the image frequency, each image obtained by the image sensor representing a scene, wherein the method comprises:

obtaining signal values representing a movement of said scene from a high-frequency movement sensor, the high-frequency movement sensor generating signal values representing movements in said scene with a second signal-acquisition frequency, referred to as the movement frequency, higher than the image frequency;

determining values representing a movement in an image in the course of acquisition by the image sensor from values of the signals representing the movement of said scene, the determination of the values representing the movement of said scene, the determination of the values representing the movement of the image in the course of acquisition by the image sensor comprises a matrix operation between the values of the signals representing the movement of said scene and a conversion matrix;

transmitting the values representing the movement of the image in the course of acquisition by the image sensor thus determined to a movement compensation device; and implementing, by said movement compensation device, a feedback in the optronic system in order to compensate for the movement of the image in the course of acquisition by the image sensor, the feedback being implemented in the optronic system with a frequency less than or equal to the movement frequency;

an inverse matrix of the conversion matrix being determined by a determination method comprising:

obtaining a reference image from an original image acquired by the image sensor, simulating first values of the signals representing a movement obtained by the high-frequency movement sensor when the high-frequency movement sensor is subjected to a light beam corresponding to the reference image, applying movements of predetermined movement values to the reference image in order to obtain a set of moved images, for each moved image in the set of moved images, simulating second values of the signals representing a movement obtained by the high-frequency movement sensor when the high-frequency movement sensor is subjected to a light beam corresponding to the moved image, and determining the inverse matrix of the conversion matrix from first and second values of the signals representing a movement obtained by the high-frequency movement sensor and predetermined movement values.

2. The method according to claim 1, wherein the high-frequency movement sensor is a multi-element photodiode.

3. The method according to claim 1, wherein the conversion matrix is updated periodically at a frequency lower than or equal to the image frequency.

4. The method according to claim 1, wherein, for each moved reference image, the predetermined movement values comprise a horizontal movement value and a vertical movement value.

5. The method according to claim 1, wherein, for each moved reference image, the predetermined movement values comprise a movement direction value and a movement amplitude value.

6. The method according to claim 1, wherein the set of moved reference images comprises at least two images.

7. The method according to claim 1, wherein the reference image results from an application of a sub-pixel interpolation to the original image obtained by the image sensor.

8. A device for processing high-frequency movements in an optronic system comprising an image sensor functioning with a first signal-acquisition frequency, referred to as the image frequency, each image obtained by the image sensor representing a scene, wherein the device comprises circuitry configured for:

obtaining signal values representing a movement of said scene from a high-frequency movement sensor, the high-frequency movement sensor generating signal values representing movements in said scene with a second signal-acquisition frequency, referred to as the movement frequency, higher than the image frequency, determining values representing a movement of an image in the course of acquisition by the image sensor from values of the signals representing the movement of said scene, the determining of the values representing the movement of the image in the course of acquisition by the image sensor comprising performing a matrix operation between the values of the signals representing the movement of said scene and a conversion matrix;

transmitting determined values representing the movement of the image in the course of acquisition by the image sensor to a movement compensation device, the movement compensation device using the values representing the movement to implement feedback in the optronic system in order to compensate for the movement of the image in the course of acquisition by the image sensor, the feedback being implemented by the optronic system with a frequency less than or equal to the movement frequency;

said device being further configured for determining an inverse matrix of the conversion matrix by obtaining a reference image from an original image acquired by the image sensor, simulating first values of the signals representing a movement obtained by the high-frequency movement sensor when the high-frequency movement sensor is subjected to a light beam corresponding to the reference image, applying movements of predetermined movement values to the reference image in order to obtain a set of moved images, simulating, for each moved image of the set of moved images, second signal values representing a movement obtained by the high-frequency movement sensor when the high-frequency movement sensor is subjected to a light beam corresponding to the moved image, and determining the inverse matrix of the conversion matrix from first and second values of the signals representing a movement obtained by the high-frequency movement sensor and predetermined movement values.

9. The device according to claim 8, wherein a correction filter is inserted in front of the image sensor and/or in front of the high-frequency sensor in order to compensate for any difference between a spectral response of the image sensor and a spectral response of the high-frequency movement sensor.

10. An optronic system comprising an image sensor functioning with a first signal-acquisition frequency, each image obtained by the image sensor representing a scene, and a movement compensation device, wherein the system comprises:

a high-frequency movement sensor generating signal values representing movements of said scene with a second signal-acquisition frequency higher than the first signal-acquisition frequency;

a device for processing high-frequency movements comprising circuitry configured for:

obtaining signal values representing a movement of said scene from a high-frequency movement sensor, the high-frequency movement sensor generating signal values representing movements in said scene with a second signal-acquisition frequency, referred to as the movement frequency, higher than the image frequency;

determining values representing a movement of an image in the course of acquisition by the image sensor from values of the signals representing the movement of said scene, the determining of the values representing the movement of the image in the course of acquisition by the image sensor comprising performing a matrix operation between the values of the signals representing the movement of said scene and a conversion matrix;

transmitting determined values representing the movement of the image in the course of acquisition by the image sensor to a movement compensation device comprised in the optronic system;

said device for processing high-frequency movements being further configured for determining an inverse matrix of the conversion matrix by:

obtaining a reference image from an original image acquired by the image sensor;

simulating first values of the signals representing a movement obtained by the high-frequency movement sensor when the high-frequency movement sensor is subjected to a light beam corresponding to the reference image;

applying movements of predetermined movement values to the reference image in order to obtain a set of moved images;

simulating, for each moved image of the set of moved images, second signal values representing a movement obtained by the high-frequency movement sensor when the high-frequency movement sensor is subjected to a light beam corresponding to the moved image; and determining the inverse matrix of the conversion matrix from first and second values of the signals representing a movement obtained by the high-frequency movement sensor and predetermined movement values; and a movement compensation device implementing feedback in the optronic system using the values representing the movement transmitted by the device for processing high-frequency movements to compensate for the movement of the image in the course of acquisition by the image sensor device, the feedback being implemented by the optronic system with a frequency less than or equal to the movement frequency.

11. A non-transitory information storage medium storing a computer program product containing instructions for implementing, by a device, the method according to claim 1, when said program is executed by a processor of said device.

* * * * *